US012459128B2

(12) United States Patent
Dong et al.

(10) Patent No.: US 12,459,128 B2
(45) Date of Patent: Nov. 4, 2025

(54) TELE-OPERATION ASSISTANCE SYSTEM AND TELE-OPERATION ASSISTANCE METHOD

(71) Applicants: HONDA MOTOR CO., LTD., Tokyo (JP); Honda Research Institute Europe GmbH, Offenbach/Main (DE)

(72) Inventors: Yili Dong, Wako (JP); Tomoki Watabe, Wako (JP); Simon Manschitz, Offenbach/Main (DE); Dirk Ruiken, Offenbach/Main (DE)

(73) Assignees: HONDA MOTOR CO., LTD., Tokyo (JP); Honda Research Institute Europe GmbH, Offenbach/Main (DE)

( * ) Notice: Subject to any disclaimer, the term of this patent is extended or adjusted under 35 U.S.C. 154(b) by 224 days.

(21) Appl. No.: 18/218,612

(22) Filed: Jul. 6, 2023

(65) Prior Publication Data
US 2024/0051143 A1 Feb. 15, 2024

(30) Foreign Application Priority Data
Aug. 10, 2022 (JP) ................................. 2022-128357

(51) Int. Cl.
*B25J 9/16* (2006.01)
*B25J 13/06* (2006.01)
(52) U.S. Cl.
CPC .............. *B25J 9/1689* (2013.01); *B25J 13/06* (2013.01)
(58) Field of Classification Search
CPC ........ B25J 9/1689; B25J 13/06; B25J 9/1682; B25J 13/02; B25J 13/00; G06F 3/011;
(Continued)

(56) References Cited

U.S. PATENT DOCUMENTS 9,043,023 B2 * 5/2015 Noro ........................ B25J 15/00
700/251
10,919,152 B1 * 2/2021 Kalouche ............... B25J 9/1697
(Continued)

FOREIGN PATENT DOCUMENTS

JP 6476358 2/2019
WO 2019/069850 4/2019

OTHER PUBLICATIONS

Japanese Office Action for Japanese Patent Application No. 2022-128357 dated Feb. 18, 2025.
Fuchs, et al. "Gaze-Based Intention Estimation for Shared Autonomy in Pick-and-Place Tasks", frontiers in Neurorobotics, Apr. 16, 2021, pp. 1-17.
(Continued)

*Primary Examiner* — Kira Nguyen
(74) *Attorney, Agent, or Firm* — Amin, Turocy & Watson, LLP

(57) ABSTRACT

A tele-operation assistance system includes: a motion acquisition unit configured to acquire information on a motion of an operator operating an end effector; an intention understanding unit configured to estimate a target object to be operated by the end effector and a task which is a method of operating the target object; an environmental situation determination unit configured to acquire environmental information of an environment in which the end effector is operated; and an operation amount determination unit determine an operation amount of the end effector. The operation amount determination unit estimates an operation distance to the target object based on information of the target object and the motion of the operator, determines an operation state of the end effector according to the estimated operation distance, and changes an input mode of an assistance to a tele-operation according to the operation state.

4 Claims, 12 Drawing Sheets

(58) Field of Classification Search
CPC .......... G06F 3/014; G05B 2219/39124; G05B 2219/40155; G05B 2219/40408; G05B 2219/40413
USPC ......................................................... 700/264
See application file for complete search history.

(56) References Cited

U.S. PATENT DOCUMENTS

2017/0282363 A1* 10/2017 Yamada ................. B25J 9/1612
2020/0230803 A1    7/2020 Yamashita et al.
2020/0368903 A1* 11/2020 Miyamoto ............. B25J 9/1656

OTHER PUBLICATIONS

Feix, et al. "The GRASP Taxonomy of Human Grasp Types", IEEE Transactions on Human-Machine Systems (vol. 46, Issue: 1, Feb. 2016), IEEE, p. 66-77.
He, et al. "Mask R-CNN", in IEEE international Conference on Computer Vision, 2017.
Zhou, et al. "Fast global registration", in European Conference on Computer Vision, 2016.
Chen, et al. "Object modelling by registration of multiple range images", Proceedings of the 1991 IEEE International Conference on Robotics and Automation, pp. 2724-2729, 1991.
Hodan, et al. "On evaluation of 6d object pose estimation", in European Conference on Computer Vision, 2016.
Programs of IEEE International conference on robotics and automation 2022, Philadelphia (PA), USA, May 23-27, 2022.
Manschitz, et al. "Shared Autonomy for Intuitive Teleoperation", ICRA, 2022.

* cited by examiner

| NUMBER | SUBTASK NAME |
|---|---|
| 1 | Approach Object |
| 2 | Snap to Object |
| 3 | Align with Object |
| 4 | Grasp Object |
| 5 | Align with Surface |
| 6 | Unsnap from Surface |
| 7 | Approach Surface |
| 8 | Snap to Surface |
| 9 | Release Object |

TELE-OPERATION ASSISTANCE SYSTEM AND TELE-OPERATION ASSISTANCE METHOD

CROSS-REFERENCE TO RELATED APPLICATION

Priority is claimed on Japanese Patent Application No. 2022-128357, filed Aug. 10, 2022, the content of which is incorporated herein by reference.

BACKGROUND OF THE INVENTION

Field of the Invention

The present invention relates to a tele-operation assistance system and a tele-operation assistance method.

Description of Related Art

Technology has been proposed for controlling a robot by tele-operation by an operator (see, for example, Patent Document 1 below).

In such tele-operation, for example, the robot is remotely controlled by instructions from a sensor worn by the operator. The robot must perform a variety of tasks on a variety of objects in response to tele-operation instructions.

[Patent Document 1] Japanese Patent No. 6476358

SUMMARY OF THE INVENTION

However, the technology described in Patent Document 1 could not assist in diverse teleoperation tasks, in which a variety of tasks are performed on a variety of objects.

Aspects of the present invention were made in consideration of the aforementioned circumstances and an objective thereof is to provide a tele-operation assistance system and a tele-operation assistance method capable of assisting diverse teleoperation tasks in which a variety of tasks are performed on a variety of objects.

In order to solve the aforementioned problems and to achieve the aforementioned objective, the present invention employs the following aspects.

(1) A tele-operation assistance system according to an aspect of the present invention is a tele-operation assistance system for remotely operating at least an end effector, including: a motion acquisition unit configured to acquire information on a motion of an operator operating at least the end effector; an intention understanding unit configured to estimate a target object to be operated by the end effector and a task which is a method of operating the target object by using the information acquired by the motion acquisition unit; an environmental situation determination unit configured to acquire environmental information of an environment in which the end effector is operated; and an operation amount determination unit configured to acquire information from the intention understanding unit and the environmental situation determination unit, and determine an operation amount of the end effector based on the acquired information, wherein the operation amount determination unit estimates an operation distance to the target object based on the information of the target object and the motion of the operator, determines an operation state of the end effector with respect to the target object according to the estimated operation distance, and changes an input mode of assistance to a tele-operation according to the operation state.

(2) In the aspect of (1), the operation state may be classified into: a distant state in which a distance to the target object is farther; a peripheral state in which a position to the target object is closer; and an operated state in which the target object is operated, and the input mode of assistance includes: a distant mode which directly uses the motion of the operator during the distant state in which the distance to the target object is farther; a peripheral mode which guides to a working position of the object to the target object during the peripheral state in which the position to the target object is closer; and an operated mode which assists a manipulation to the target object during the operated state in which the target object is operated.

(3) In the aspect of (2), the peripheral mode may be classified into: a state of bringing a hand close to the target object (Approach Object); a state of moving the hand to a position where the target object can be grasped (Snap to Object); a state of adjusting a final grasping position in accordance with a surface of the target object and in response to an instruction of the operator (Align with Object); a state of moving the hand away from a vicinity of the target object (Align with Object), the operation amount determination unit may switch transitions among the four states according to a work content and a work state.

(4) In the aspect (3), the operation amount determination unit may switch the transitions among the four states according to the work content and the work state, using hand command values of the operator obtained by the motion acquisition unit, an intention information estimated by the intention understanding unit, the environmental information obtained by the environmental situation determination unit, and a model learned by inputting a teacher data which is the work content.

(5) A tele-operation assistance method according to an aspect of the present invention is performed by a tele-operation assistance system for remotely operating at least an end effector, including: acquiring information on a motion of an operator operating at least the end effector; estimating a target object to be operated by the end effector and a task which is a method of operating the target object by using the information acquired by the motion acquisition unit; acquiring environmental information of an environment in which the end effector is operated; and acquiring information from the intention understanding unit and the environmental situation determination unit, and determining an operation amount of the end effector based on the acquired information, the tele-operation assistance method further comprising: estimating an operation distance to the target object based on the information of the target object and the motion of the operator, determining an operation state of the end effector with respect to the target object according to the estimated operation distance, and changing an input mode of an assistance to a tele-operation according to the operation state.

According to the above aspects (1) to (5), it is possible to assist in diverse teleoperation tasks in which a variety of tasks are performed on a variety of objects.

DETAILED DESCRIPTION OF THE INVENTION

Figure 1:
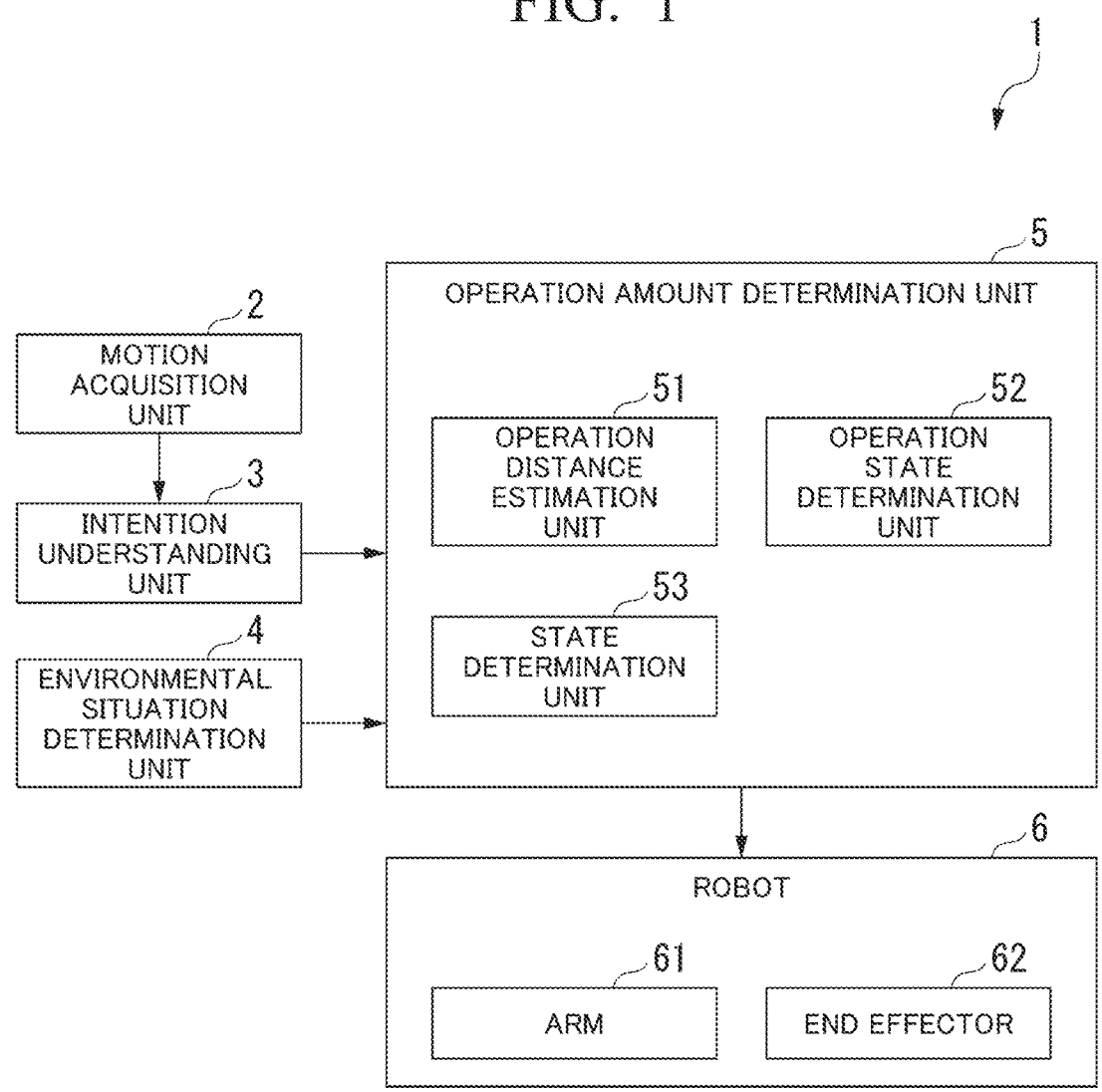
FIG. 1 is a diagram illustrating an example of a configuration of a tele-operation assistance system according to an embodiment.

Hereinafter, an embodiment of the present invention will be described with reference to the accompanying drawings. In the drawings mentioned in the following description, scales of members are appropriately changed to illustrate the members in recognizable sizes.

In all the drawings mentioned in the following description of embodiment, the same elements having the same functions will be referred to by the same reference signs and description thereof will not be repeated.

"On the basis of XX" mentioned in this specification means "on the basis of at least XX" and includes cases of "on the basis of another element in addition to XX." "On the basis of XX" is not limited to cases in which XX is directly used, but includes cases of "on the basis of a result obtained by performing calculation or processing on XX." "XX" is an arbitrary element (for example, arbitrary information).

<Tele-Operation Assistance System>

FIG. 1 is a diagram illustrating an example of a configuration of a tele-operation assistance system according to an embodiment. As shown in FIG. 1, the tele-operation assistance system 1 includes a motion acquisition unit 2, an intention understanding unit 3, an environmental situation determination unit 4, an operation amount determination unit 5, and a robot 6.

The operation amount determination unit 5 includes, for example, an operation distance estimation unit 51, an operation state determination unit 52, and a state determination unit 53.

The robot 6 is provided with, for example, an arm 61 and an end effector 62. In FIG. 1, the robot controller 7 is omitted from the figure.

The motion acquisition unit 2 acquires information about a motion of an operator operating at least the end effector 62. The motion acquisition unit 2 is, for example, a data glove.

The intention understanding unit 3 uses information acquired by the motion acquisition unit 2 to estimate a target object, which is an object to be operated by the end effector 62, and a task, which is a method of operating the target object. The intention understanding unit 3 performs intention estimation using, for example, the method of JP Patent Application No. 2021-058952. The intention understanding unit 3 may, for example, estimate the target object based on position information of the operator's fingers and the operator's line of sight. The task to be estimated is, for example, a taxonomy of the task the operator is about to perform (see Reference 1)

Reference 1; Thomas Feix, Javier Romero, et al, "The GRASP Taxonomy of Human Grasp Types," IEEE Transactions on Human-Machine Systems (Volume: 46, Issue: 1, February2016), IEEE, p 66-77

The environmental situation determination unit 4 acquires environmental information of an environment in which the end effector 62 is operated. The environmental situation determination unit 4 may be, for example, a photographic device installed in a work environment or a photographic device attached to the robot 6. The environmental situation determination unit 4 acquires the shape, size, position, etc. of the target object using the RGB (red-green-blue) information and depth information contained in the captured image.

The operation amount determination unit 5 acquires information from the intention understanding unit 3 and the environmental situation determination unit 4, and determines an operation amount of the end effector 62 based on the acquired information.

The operation distance estimation unit 51 estimates an operation distance to the target object from the information of the target object and the operator's actions. The operation distance to the target object may be, for example, either the distance in the screen that the operator can see with the HMD or the actual distance on the robot 6 side.

The operation state determination unit 52 determines an operation state of the end effector with respect to the target object according to the operation distance estimated by the operation distance estimation unit 51. The state is, for example, a state in which an operation is started, a state during the operation, a grasping state, and the like.

The state determination unit 53 changes an input mode of assistance to tele-operation according to the operation state.

The robot 6 is, for example, one of a one-armed arm robot, a dual-armed arm robot, and a multi-armed arm robot.

The arm 61 has an end effector 62 connected to its tip.

The end effector 62 includes at least two finger sections. The number of fingers provided by the end effector 62 may be three or more.

<Overview of Tele-Operation>

Figure 2:
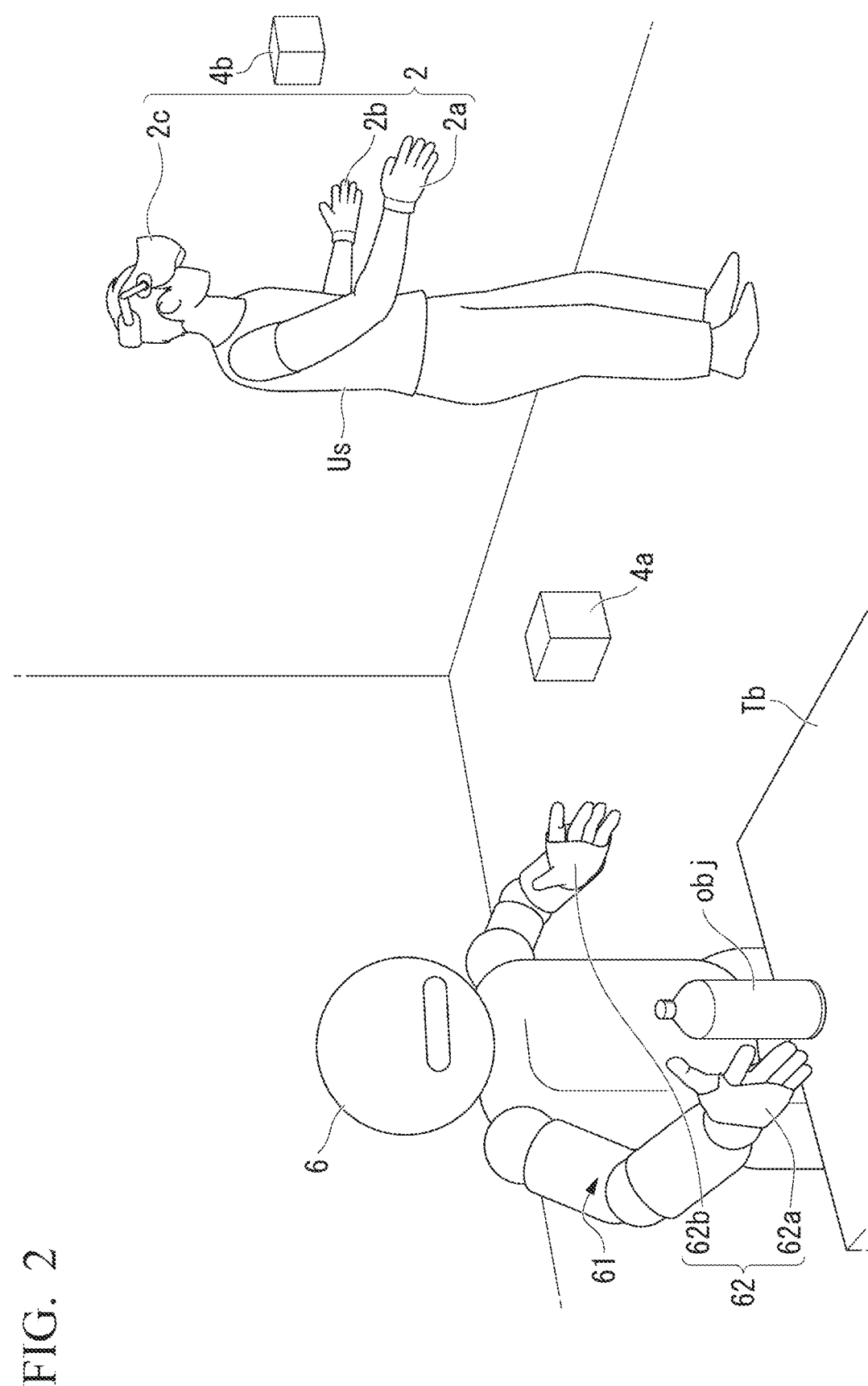
FIG. 2 is a diagram illustrating an overview of a tele-operation according to the embodiment.

FIG. 2 is a diagram illustrating an overview of a tele-operation according to the embodiment. The robot 6 shown in FIG. 2 is an example with twin arms, a head and a body, but the configuration, shape, etc. of the robot 6 are not limited to this.

As shown in FIG. 2, the operator Us wears, for example, an HMD (head-mounted display) 2c and data gloves 2a and 2b. An environmental situation determination unit 4a (an environmental sensor), is installed in the robot 6 or an area around the robot 6 and an environmental sensor 4b is also installed in the work environment. The environmental situation determination unit 4(4a) (the environmental sensor)

may be attached to the robot 6. The robot 6 is provided with end effectors 62 (62a, 62b). The operator Us operates the robot 6 remotely by moving his/her hands and fingers wearing the data gloves 2a and 2b while viewing the images displayed on the HMD 2c.

<Processing Procedure Example>

Figure 3:
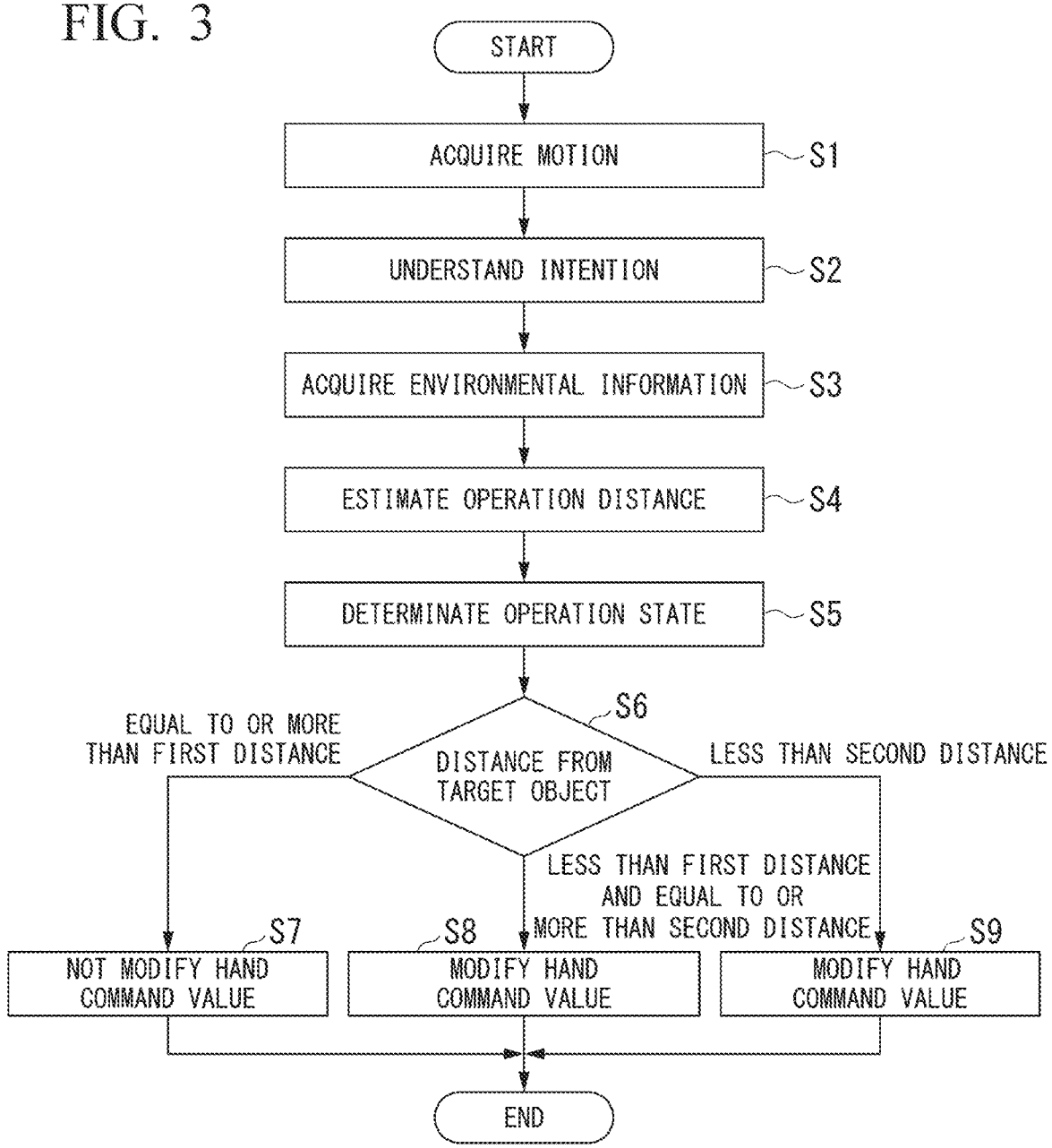
FIG. 3 is a flowchart illustrating an example of a processing procedure of the tele-operation assistance system according to the embodiment.

Next, an example of the processing procedure of the tele-operation assistance system 1 is described. FIG. 3 is a flowchart illustrating an example of a processing procedure of the tele-operation assistance system according to the embodiment.

(Step S1) The motion acquisition unit 2 acquires information on the motion of the operator operating at least the end effector 62.

(Step S2) The intention understanding unit 3 uses the information acquired by the motion acquisition unit 2 to estimate the target object, which is the object to be operated by the end effector 62, and the task, which is the method of operating the target object.

(Step S3) The environmental situation determination unit 4 acquires environmental information of the environment in which the end effector 62 is operated.

(Step S4) The operation distance estimation unit 51 estimates the operation distance to the target object from the information of the target object and the operator's actions.

(Step S5) The operation state determination unit 52 classifies the operation distance estimated by the operation distance estimation unit 51, i.e., the distance between the human hand command value and the target object, into the following three categories: Equal to or more than a first distance (a distant state in which a distance to the target object is farther); Less than the first distance and equal to or more than a second distance (a peripheral state in which a position to the target object is closer); Less than the second distance (an operated state in which the target object is operated). "Equal to or more than a first distance" is, for example, a state in which a distance between the human hand command value and the target object is farther. "Less than the first distance and equal to or more than a second distance" is, for example, a state in which the human hand command value can be regarded as being in the vicinity of the target object. "Less than the second distance" is, for example, a state in which the distance between the human hand command value and the target object is closer. The first distance is for example 20 cm for the actual distance on the robot 6 side. The second distance is for example 5 cm for the actual distance on the robot 6 side. The length of the distance is an example and may be, for example, a distance according to the target object.

(Step S6) In the case of "Equal to or more than a first distance", the operation state determination unit 52 proceeds to the process of step S7 (a first mode). In the case of "Less than the first distance and equal to or more than a second distance", the operation state determination unit 52 proceeds to the processing of step S8 (a second mode). In the case of "Less than the second distance", the operation state determination unit 52 proceeds to the processing of step S9 (a third mode).

(Step S7) The state determination unit 53 outputs the acquired hand command value as it is to the robot 6 as a command value without modifying the hand command value.

(Step S8) The state determination unit 53 modifies the hand command value. More specifically, the state determination unit 53 moves the command value to the robot 6 to a position where it can work while avoiding collision with the target object.

(Step S9) The state determination unit 53 modifies the hand command value. More specifically, it accepts instructions to start and end the work operation while ensuring that the distance between the command value to the robot 6 and the target object remains within the range where the work can be performed immediately.

Thus, in this embodiment, the input mode of assistance is varied according to the operation state (distance to the object included). The input mode of assistance is a distant mode (step S7) which directly uses the motion of the operator during the distant state in which the distance to the object is farther. The input mode of assistance is a peripheral mode (step S8) which guides to a working position of the target object during the peripheral state in which the position to the object is closer. The input mode of assistance is an operated mode (step S9) which assists an operation to the target object during the operated state in which the target object is operated. The modifications in steps S8 and S9 are performed using models where learning has been done in each mode.

The tele-operation assistance system 1 repeats the above process until one operation (e.g., start grasping, grasping, leaving after grasping, etc.) is completed.

First Embodiment

This embodiment describes an example in which the second mode has four states.

Figure 4:
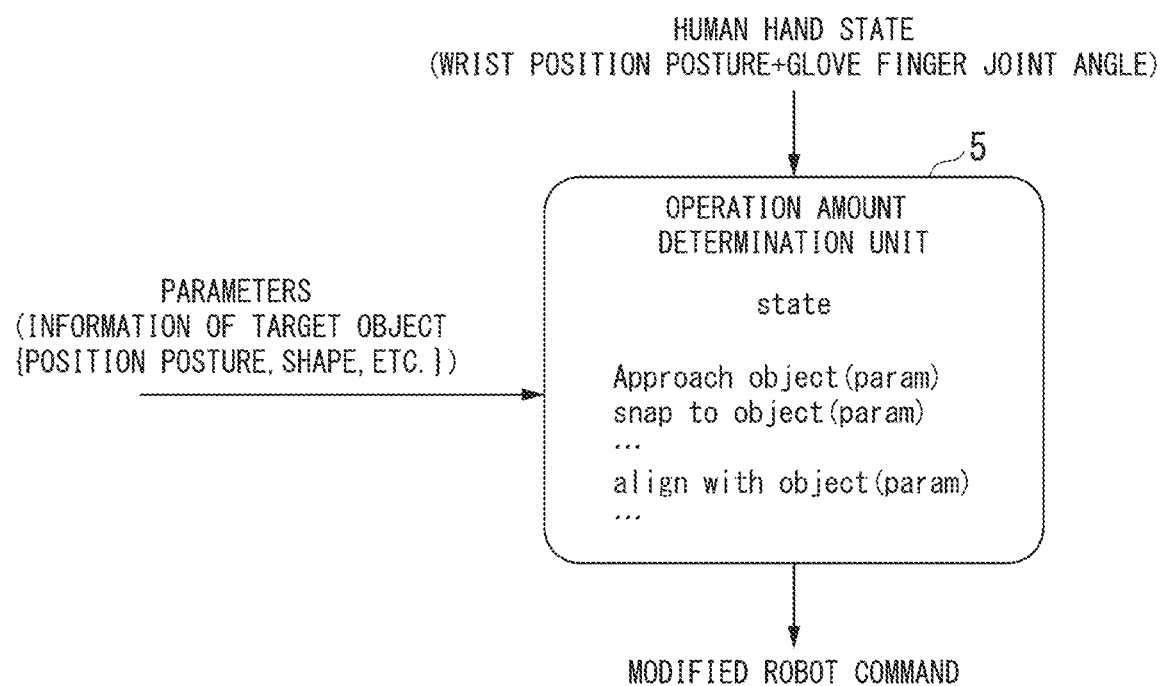
FIG. 4 is a diagram illustrating a correction of human hand command values in a second mode according to a first embodiment.

FIG. 4 is a diagram illustrating a correction of human hand command values in a second mode according to the embodiment. As shown in FIG. 4, the operation amount determination unit 5 corrects the input human hand command values using parameters. The human hand command value is a human hand state and includes, for example, the human wrist position posture and the human finger joint angle information detected by the sensors provided by the data glove. The parameters are the results detected by the environmental situation determination unit 4 and include, for example, information about the target object, such as the position information of the target object and the shape of the target object.

The second mode can be classified into four states, for example, as shown in FIG. 4.

"Approach Object (parameter)" is an instruction to bring the hand closer to the object and is used when there is some distance between the object and the hand. "Snap to Object (parameter)" is an instruction to move to a position where the object can be grasped, and is used when moving to the vicinity of the object where work can begin immediately. "Align with Object (parameter)" is an instruction to adjust a final grasping position in response to a person's instruction, for example, to align with a surface of the target object, and is used to adjust a working point along the surface of the target object. Furthermore, "unsnap from object (parameter)" described later is used when leaving the vicinity of the target object.

However, since transition criteria between the above modes and states are determined by the distance between the operator's hand command value and the object of interest, a separate module is required to estimate the target object and its detailed information (position posture, shape, etc.). At the same time, detailed parameters are required to determine the specifications of each mode and state, and these parameters are also determined by the target object and its object information described above.

In this way, in the embodiment, the four states of the second mode (Approach Object, Snap to Object, Align with Object, and unsnap from object) are transitioned to work during the peripheral state in which the position to the target object is closer.

In the example described above, the four states of the second mode are described as shown in FIG. 4, but the number of states of the second mode may be three or less, or five or more.

In the example described above, the distance between the human hand command value and the target object is classified into three, but it is not limited to this. The distance between the human hand command value and the target object may be classified into two, four or more.

(In the Case of Grasping Works)

Figure 5:
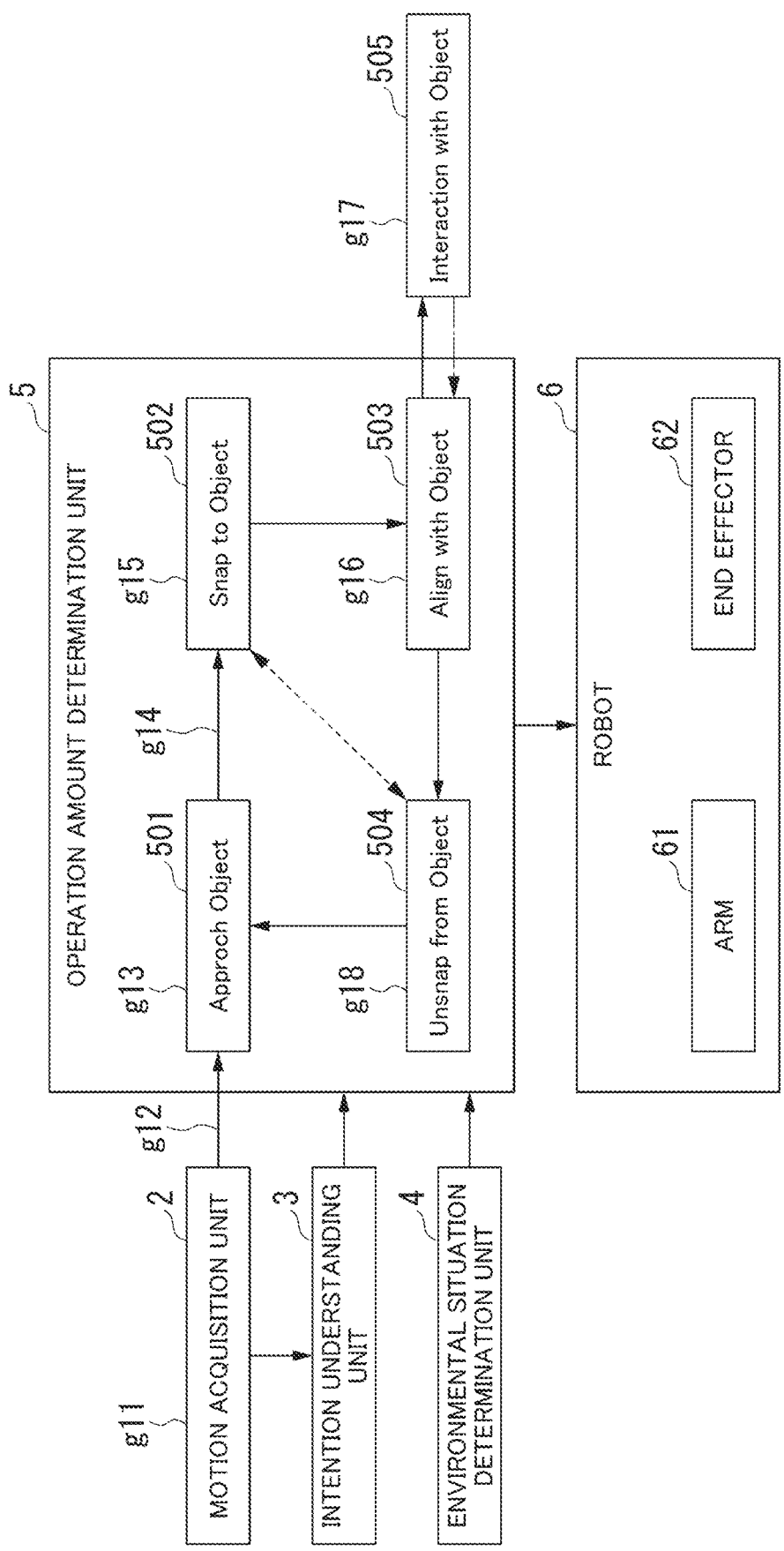
FIG. 5 is a diagram illustrating an example of a processing during a grasping work according to the first embodiment.

Here, an example of a processing performed by the operation amount determination unit 5 during a grasping work is described. FIG. 5 is a diagram illustrating an example of a processing during a grasping work according to the embodiment. Interaction with Object 505 is an instruction by the operator's intervention in the support, for example, by operating the fingers of the data glove. For example, if a grasping position is misaligned, the operator instructs an operation to correct the misalignment with the fingers of the data glove. Or, if the operator wants to grasp with the fingers when the work is in progress, the operator operates the fingers of the data glove to close (or open, etc.) the fingers. Then, when there is such an intervention of the operator's instruction, Align with Object 503 corrects based on the intervention.

Assume that a preoperational condition is that a distance between the end effector 62 and the object is a little far. Therefore, the human hand command value is not grasping the object, not touching the object, and is empty-handed (G11).

In this state, since the distance between the target object and the finger section of the end effector 62 is a little distance, the finger section is brought closer to the target object (g12).

In this work, the process is performed without the support of Approach Object 501 (g13), and the finger section is brought closer to the target object within a predetermined range (g14).

Next, Snap to Object 502 activates a support action to move to a position where it can be grasped safely (e.g., without colliding with the target object) (g15).

Next, in response to the person's instruction to adjust the final grasping position, Align with Object 503 moves the finger section along the surface of the target object (g16).

Next, Interaction with Object 505 causes the finger section of end effector 62 to close (G17). This causes the end effector 62 to grasp the target object.

Since the grasping work requires the finger section to move away from the target object after grasping, Unsnap to Object 504 removes the finger section from the target object and makes it move away from the object (g18).

In each of the above processes, robot commands with corrected human hand command values are output to the robot 6.

(In the Case of Placing Work)

Figure 6:
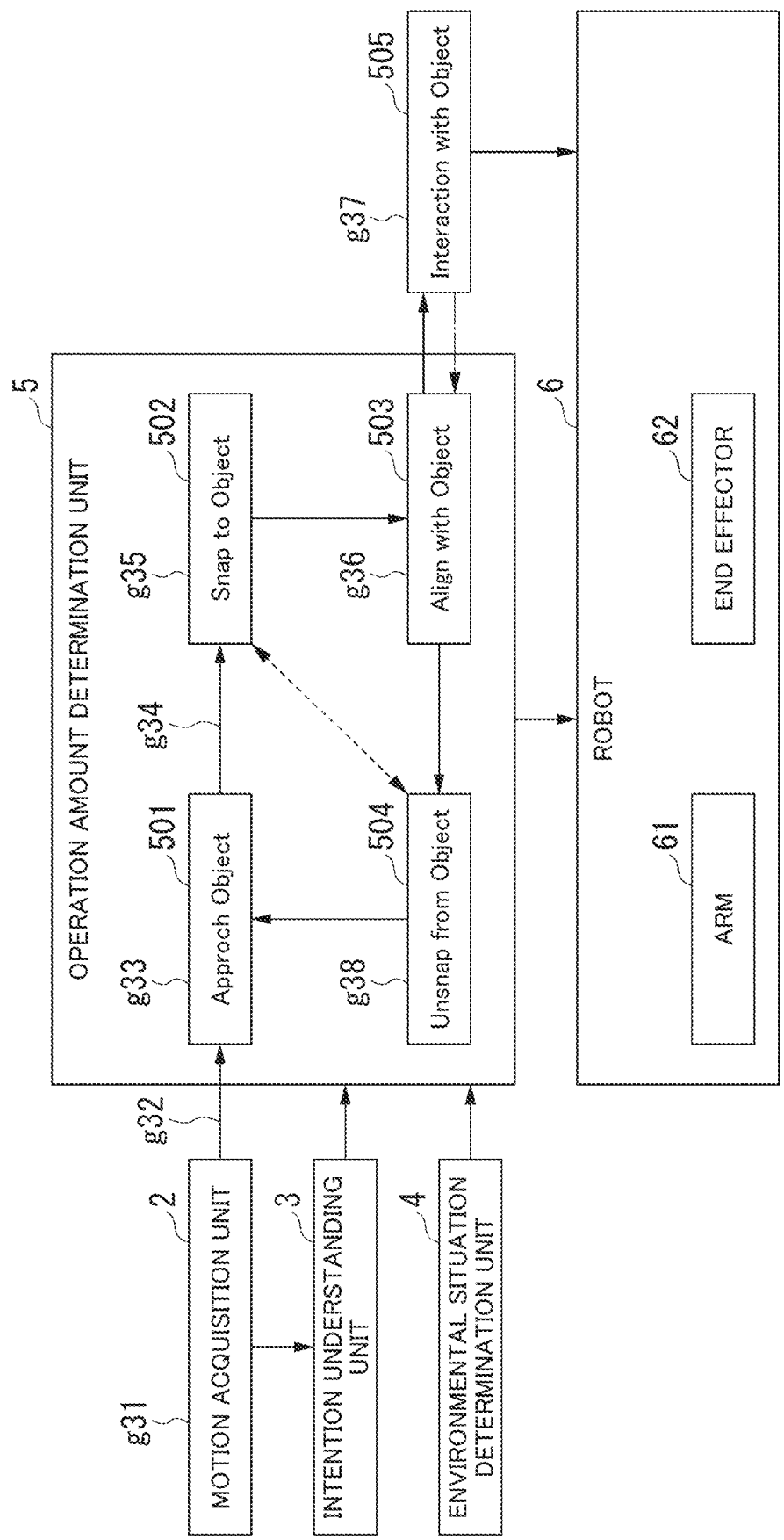
FIG. 6 is a diagram illustrating an example of a processing during a placing work according to the first embodiment.

Next, an example of a processing performed by the operation amount determination unit 5 during a placing work is described. FIG. 6 is a diagram illustrating an example of a processing during a placing work according to the embodiment. The work content is assumed to be a work of placing a grasped target object on a desk.

The finger section of the end effector 62 is grasping the object (G31).

In this state, the end effector 62 grasping the object is in a process of being brought closer to the desk, but there is a slight distance between the desk and the end effector 62 (g32).

In this work, the process is performed without the support of Approach Object 501 (g33), and the end effector 62 is brought closer to the desk within a predetermined range (g34).

Next, Snap to Object 502 activates a support operation to move to a position where it can be safely placed (e.g., so that the target object or the end effector 62 does not collide with the desk) (g35).

Next, Align with Object 503 fine-tunes a position of end effector 62 in response to the person's instruction to fine-tune a final placement position along the surface of the desk (g36).

Next, Interaction with Object 505 causes the finger section of end effector 62 to open (G37). This causes the object to be placed on the desk.

Since the placing work also requires the end effector 62 to move away from the target object after the target object is placed, Unsnap to Object 504 causes the end effector 62 to move away from the target object (g38).

(In the Case of a Screw Tightening Operation)

Figure 7:
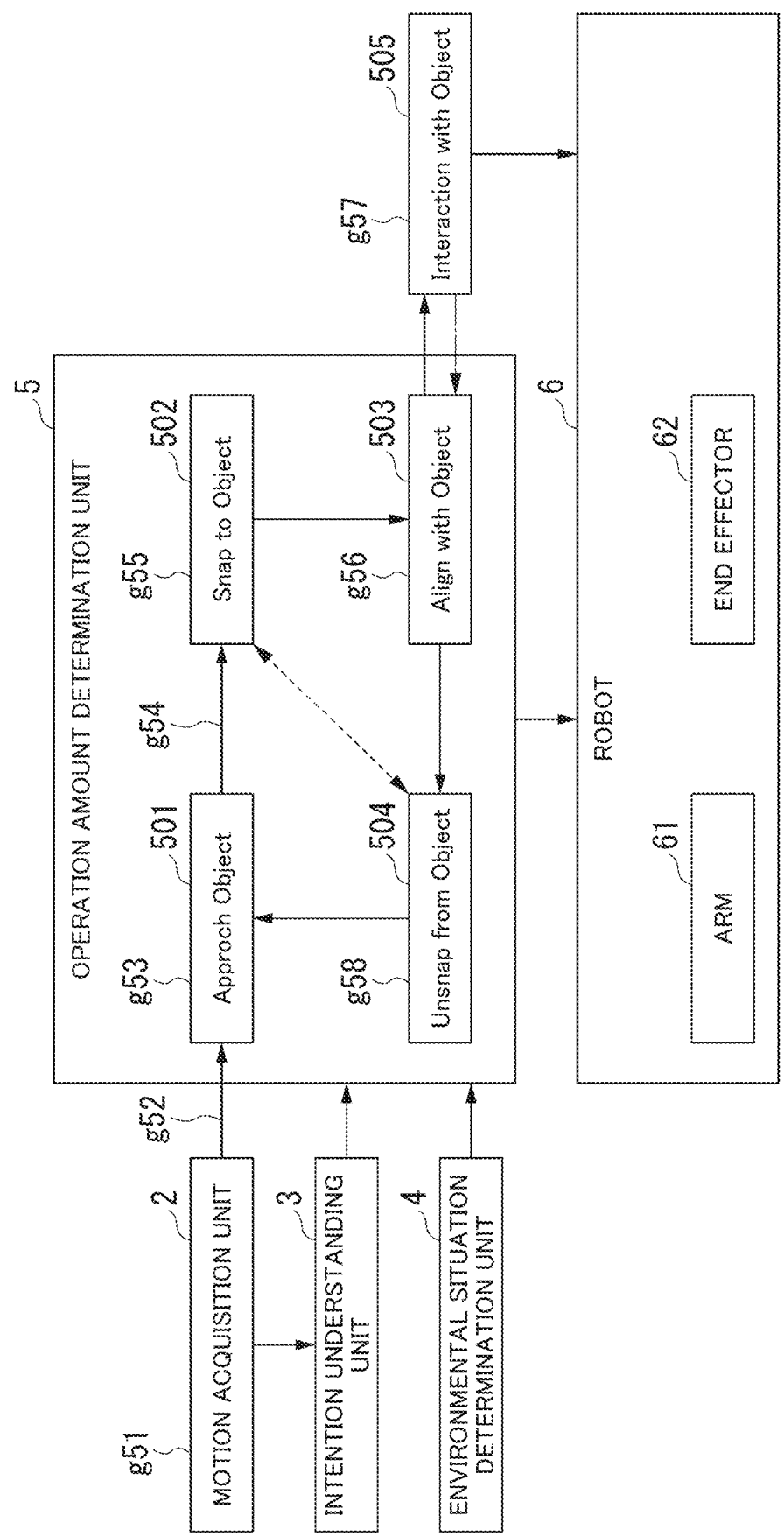
FIG. 7 is a diagram illustrating an example of a processing during a tightening screw work according to the first embodiment.

Next, an example of a processing performed by the operation amount determination unit 5 during a tightening screw work is described. FIG. 7 is a diagram illustrating an example of a processing during the tightening screw work according to the embodiment. The work content is assumed to be a work of grasping a spanner in advance and tightening a hexagonal screw with the spanner.

The finger section of the end effector 62 is grasping the spanner (G51).

In this state, the end effector 62 grasping the spanner is in a process of being brought closer to the screw, but there is a slight distance between the end effector 62 and the screw (g52).

In this work, the process is performed without the support of Approach Object 501 (g53), and the end effector 62 is brought closer to the screw within a predetermined range (g54).

Next, Snap to Object 502 activates a support operation to move the end effector 62 to a position where the screw tightening work can begin (g55).

Next, Align with Object 503 fine-tunes a position of end effector 62 in response to the person's instruction to fine-tune a final working position along the surface of the screw (g56).

Next, Interaction with Object 505 controls the movement of end effector 62 to tighten the screws (G57).

After screw tightening is completed, Unsnap to Object 504 causes the end effector 62 to move away from the screw (g58).

In the above example, the screw tightening work is described, but the same applies to the screw loosening work.

In each of the works described using FIGS. 5 to 7, the operation distance estimation unit 51 estimates the operation distance to the target object from the information of the target object and the operator's actions. The operation state determination unit 52 determines the operation state of the end effector with respect to the target object according to the operation distance estimated by the operation distance estimation unit 51. The state determination unit 53 changes the input mode of assistance to the tele-operation according to the operation state. The processing of each state and the transitions between the states in the works using FIGS. 5 to 7 are learned in advance by inputting, for example, human hand command values, estimated intention information, recognized environmental information, and teacher data into a learning model.

As described above, the operation state can be classified into the distant state where the distance from the target object is farther, the peripheral state where the position to the target object is closer, and the operated state where the target object is operated. The input modes of assistance are the distant mode which directly uses the motion of the operator during the distant state in which the distance to the target object is farther, the peripheral mode which guides to the working position of the target object during the peripheral state in which the position to the target object is closer, and the operated mode which assists the operation to the target object during the operated state in which the target object is operated.

The peripheral mode is classified: a state of bringing the hand close to the target object (Approach Object); a state of moving the hand to a position where the target object can be grasped (Snap to Object); a state of adjusting a final grasping position in accordance with the surface of the target object and in response to an instruction of the operator (Align with Object); and a state of moving the hand away from the vicinity of the target object (Unsnap to Object). Then, the operation amount determination unit 5 switches the transition between the four states according to the work content and the work state.

Figure 8:
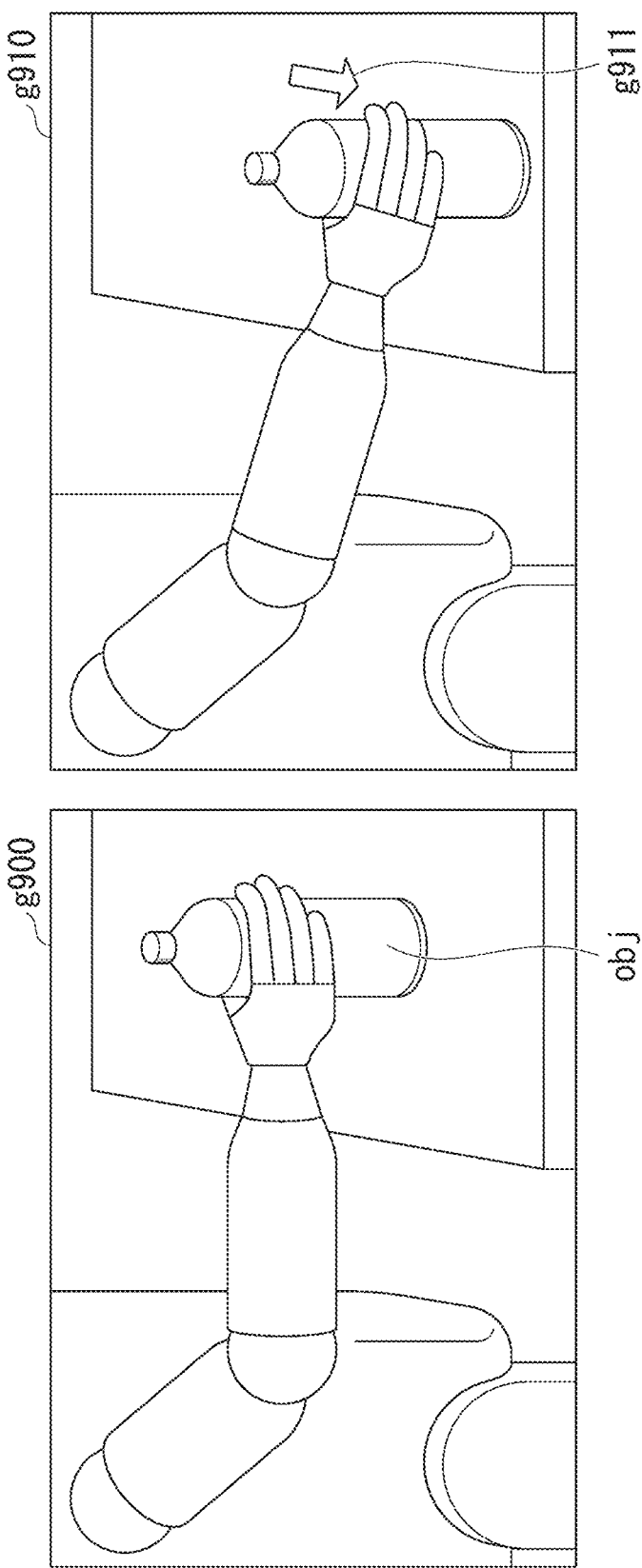
FIG. 8 is a diagram illustrating an example of work with an end effector according to a comparative example.

Here, an example of work with an end effector according to a comparative example is described. FIG. 8 is a diagram illustrating an example of work with an end effector according to the comparative example.

For example, suppose that an object obj placed at location A on a desk is picked (grasped and lifted) (g900) and is placed (moved and released) to location B (g910, g911).

When moving away from an object obj, the robot hand may move freely according to the operator's manual input, but when approaching, a SUPPORT function is required to approach a position where it can grasp the object obj without colliding with it, which has not been done in the conventional technology.

In contrast, in this embodiment, as described above, the operation amount determination unit 5 changes whether or not to correct the human hand command value and how to correct it according to the distance between the human hand command value and the target object. This makes it possible, according to this embodiment, to realize an approach to a position where grasping can be done without colliding with the object obj when approaching.

As a result, according to this embodiment, the second mode of correcting the hand command value is established in a unified mechanism. According to this embodiment, a variety of tasks can be handled with a general-purpose mode and multiple states, regardless of the type of task.

Figure 9:
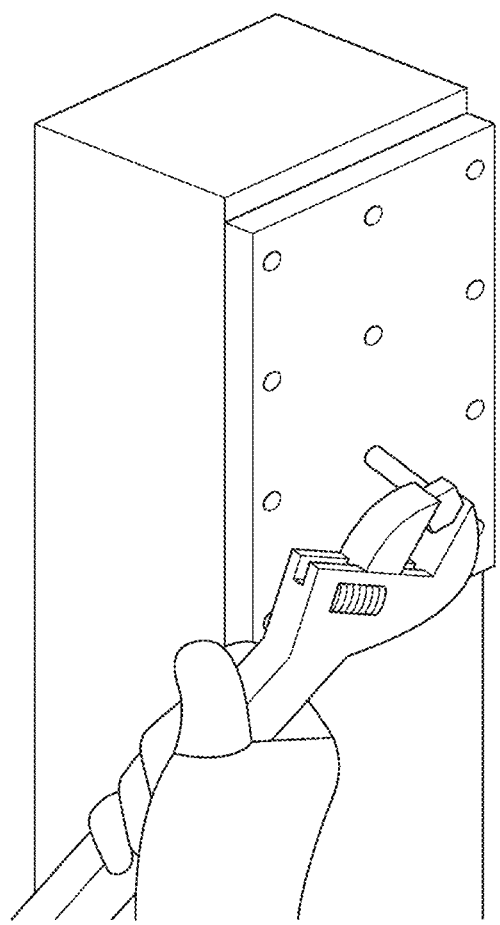
FIG. 9 is a diagram illustrating another example of work with an end effector according to a comparative example.

FIG. 9 is a diagram illustrating another example of work with an end effector according to a comparative example. The work in FIG. 9 is tightening a hexagonal screw with a spanner. In this kind of work, the spanner in the grasp may move freely, usually according to the operator's manual input, but it is preferable that the support function is activated when it approaches the hexagonal screw, which is the target object to be worked on. However, this has not been done in the conventional technology.

In contrast, in this embodiment, the support function is activated when it approaches the hexagonal screw, which is the target object to be worked on, and it is possible to realize a smooth snap to the position where tightening the hexagonal screw can be done.

Second Embodiment

This embodiment describes an example in which the second mode has nine states.

Figure 10:
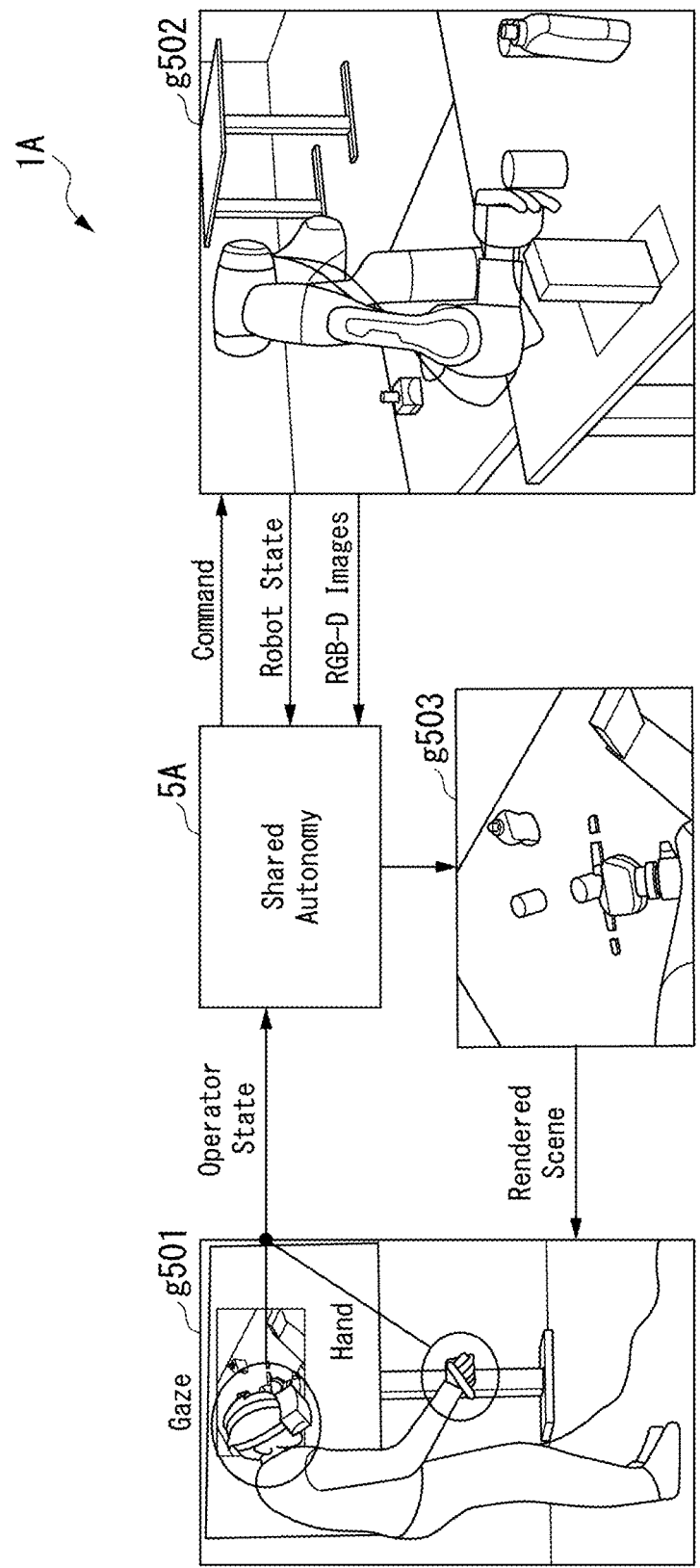
FIG. 10 is a diagram illustrating an overview of a tele-operation assistance system according to a second embodiment.

FIG. 10 is a diagram illustrating an overview of a tele-operation assistance system according to this embodiment. In this embodiment, the operator wears, for example, an HMD and a data glove, as shown in a reference sign G501. The movement of the operator's hands and fingers is detected by the data glove. Furthermore, the finger movements are detected, for example, by the continuous buttons provided by the data glove. The state of the fingers is represented by the continuous value [0, 1]. The rendered scene is presented to the operator by the HMD. The operator can freely walk around the scene in a VR. The reference sign g501 represents a work space of the operator. A reference sign g503 indicates an example image displayed on the HDM. A reference sign g502 represents a work space of the robot 6.

The tele-operation assistance system 1A processes together with the input such as the state of the operator's hand and fingers, the operator's line of sight, the state of the robot, and environmental information, and generates commands to the robot. The tele-operation assistance system 1A estimates the operator's intention and modifies the commands the operator input according to the situation.

Even in this embodiment, there is a case where the current state of the operator's hand is not sent to the robot as a target, but the state of the operator's hand is processed by the operation amount determination unit 5A. In this embodiment, the state of the hand is changed in various ways according to the current action state (e.g., grasping or approaching an object) to support the operator in achieving the purpose.

The framework of this embodiment consists of an intention understanding unit that estimates the operator's intention, an environmental situation determination unit that determines the environmental situation, an operation amount determination unit 5A that generates and modifies the target command of the robot based on the current action state, and various modules responsible for feedback to the operator.

The intention understanding unit estimates the operator's intention by tracking the operator's hand posture and gaze. For example, the intention understanding unit learns to infer the most likely object of interest from gaze patterns and the trajectories of hand movements of the operator in the VR environment, for example, by a hidden Markov model, and then uses the learned model to estimate the operator's intention.

The tele-operation assistance system 1A is provided with tactile and visual feedback functions. This establishes a two-way communication channel between the operator and the robotic system in a teleoperation environment through a feedback connection of all modalities. This feedback connection allows the operator not only to send commands to the tele-operation assistance system 1A, but rather to dialogue with the tele-operation assistance system 1A.

In order to assist the human operator in achieving his or her operational target, it is important that the operator always maintain a sense of control over the system, i.e., a sense of autonomy. In this case, it is ideal that the operator is not even aware that the tele-operation assistance system 1A is activated. For this reason, the support by the tele-operation assistance system 1A should always be subtle.

The following description describes a pick-and-place task in which the robot grasps a target object, moves the target object to a desired position while still grasping it, and places it at the desired position.

Figure 11:
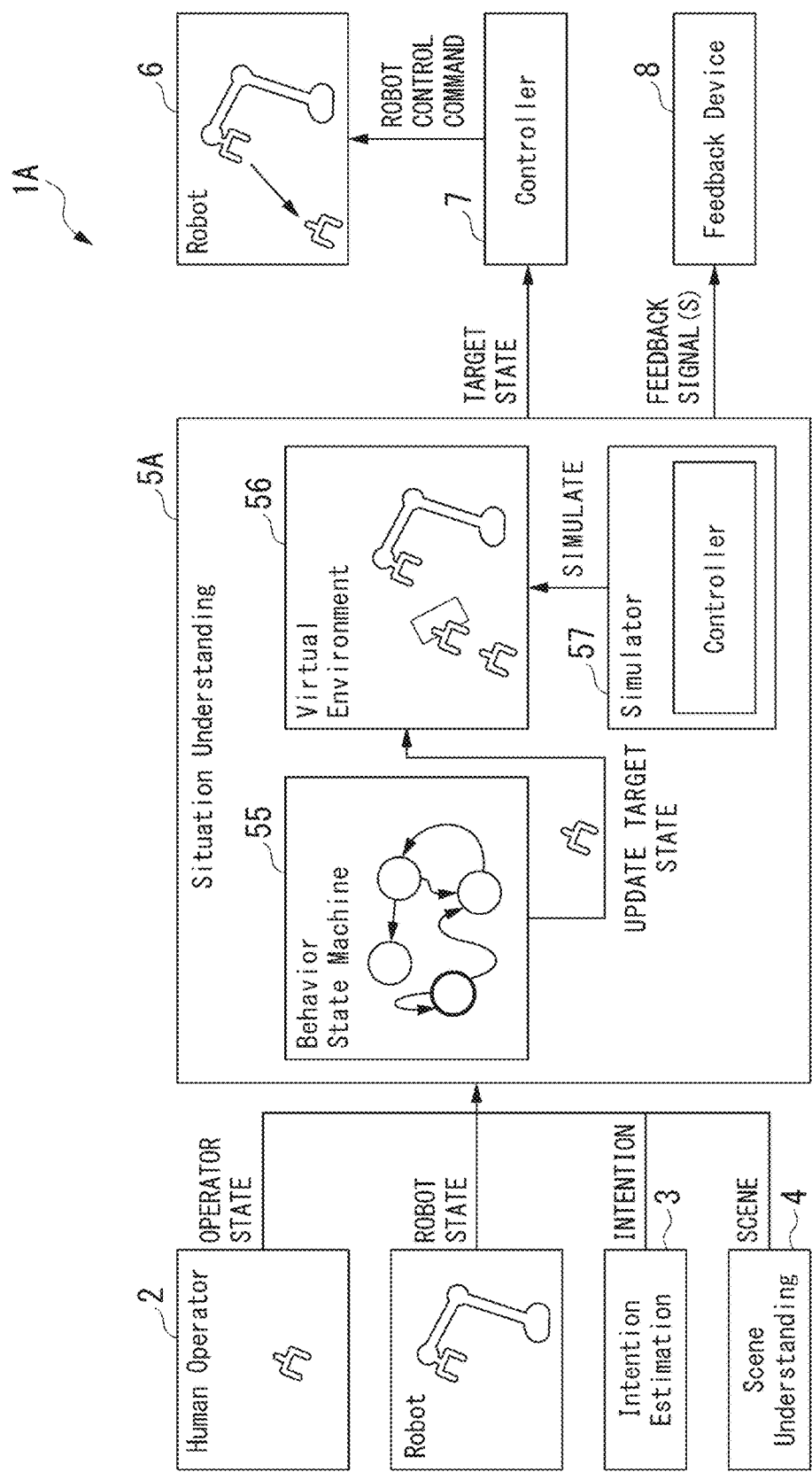
FIG. 11 is a diagram illustrating an example of the configuration of the tele-operation assistance system according to the second embodiment.

FIG. 11 is a diagram illustrating an example of the configuration of the tele-operation assistance system according to this embodiment. As shown in FIG. 11, the tele-operation assistance system 1A is provided with a motion acquisition unit 2, an intention understanding unit 3, an environmental situation determination unit 4, an operation amount determination unit 5A, a robot 6, a robot controller 7, and a feedback device 8. The tele-operation assistance system 1 described in the first embodiment may also be provided with the feedback device 8.

The operation amount determination unit 5A is provided with, for example, a behavior state machine 55, a virtual environment simulator 56, and a controller simulator 57.

Based on the current input, the behavior state machine 55 is activated to determine how the input of the operator is converted to the target hand state of the robot 6. Then the controller simulator 57 checks whether the end effector of the robot can safely reach the target object using a virtual copy of the robot controller 7. If it is determined that the end effector can be reached safely, the target object is sent to the actual robot controller 7. Then the end effector moves to the target object. In addition, feedback signals are generated to the operator, for example, when the robot 6 collides or fails to reach the target object.

(Scene Understanding and Intention Estimation)

Since the manipulation task requires physical interaction with target objects in the environment, firstly it is required to detect target objects in the scene. Furthermore, it is required to infer the operator's intent to operate. Therefore, the intention understanding unit 3 estimates the operator's operation intention, and the environmental situation determination unit 4 detects the target object in the scene.

In the detection of objects, for example, a database of object models is referenced. The database is, for example, an object model of the YCB-video dataset. Each object is accompanied by a mesh and a primitive geometric representation (cylinder, sphere, box, cone). Primitive geometries are used for collision detection, as mesh-based collision detection is too costly. For object detection and pose estimation, the scene is captured by, for example, two stationary, calibrated RGB-D imaging devices. The images are segmented with an instance of MASK R-CNN (Reference 2) for each acquisition device. Point cloud data is generated for each segment and fused across the imaging devices. After feature extraction, global registration (Reference 3) and fine registration (Reference 4) are performed. Finally, the results are filtered using attitude confidence estimation (similar to visible plane mismatch in Reference 5).

Reference 2; K. He, G. Gkioxari, P. Dollar, and R. Girshick, "Mask r-cnn," in IEEE international Conference on Computer Vision, 2017.

Reference 3; Q.-Y. Zhou, J. Park, and V. Koltun, "Fast global registration," in European Conference on Computer Vision, 2016.

Reference 4; Y. Chen and G. Medioni, "Object modelling by registration of multiple range images," Image and Vision Computing, vol. 10, no. 3, pp. 145-155, 1992.

Reference 5; T. Homas, J. Matas, and S. Obdrzalek, "On the evaluation of 6d object pose estimation," in European Conference on Computer Vision, 2016.

Detection of the operator's intention, for example, tracks the operator's hand movements and gaze to estimate what action (picking, placing, moving) the operator wants to perform on which object.

For example, in the case of picking, the tele-operation assistance system 1A estimates the target object to be grasped and the most likely grasp that the operator would like to perform on that object. In the case of placing, the tele-operation assistance system 1A estimates the most likely placement location and some parameters required to place the object. The parameters could be some details about the exact placement location, the placement area, and how the operator wants to place the object (e.g. upside down, sideways, etc.).

(Estimation of Grasping Posture and Placement Posture)

The grasping posture determines how the robot 6 grasps an object. The placement posture determines how a given object will be placed on top of other objects. To calculate such a posture, this embodiment decomposes a given object into a set of manifolds. For example, a cylindrical object can be decomposed into two circular manifolds representing the bottom and top of the object and a cylindrical manifold representing the sides of the object. This embodiment derives functions that map the different types of manifolds to each other. These functions can be used to calculate grasping and placement postures. For example, mapping the circular manifold of the bottom surface of a cylindrical object to a rectangular solid manifold representing the top surface of a table can be used to generate a placement posture that determines how the cylindrical object is placed on the table. The palm and a tool center point of the robot 6 are similarly modeled in a manifold. Therefore, the same method can be used to calculate the grasping and placement postures.

In shared autonomous teleoperation, the current grasping posture is determined by the current (virtual) position of the operator's hand and the object of interest as indicated by an intention estimator. The placement posture is calculated when an object is grasped and depends on the relative posture between the grasped object and the placement position indicated by the intention estimator. Even if the system has already determined the grasping or placement posture, an appropriate new posture on the corresponding manifold from the operator's hand movements can be found. Thus, the operator can make fine adjustments without worrying about the consistency of the grasping or placement posture. This enables a sense of agency to be achieved even when the tele-operation assistance system 1A controls part of the movements of the robot 6 according to this embodiment.

(Action)

Figures 12, 13:
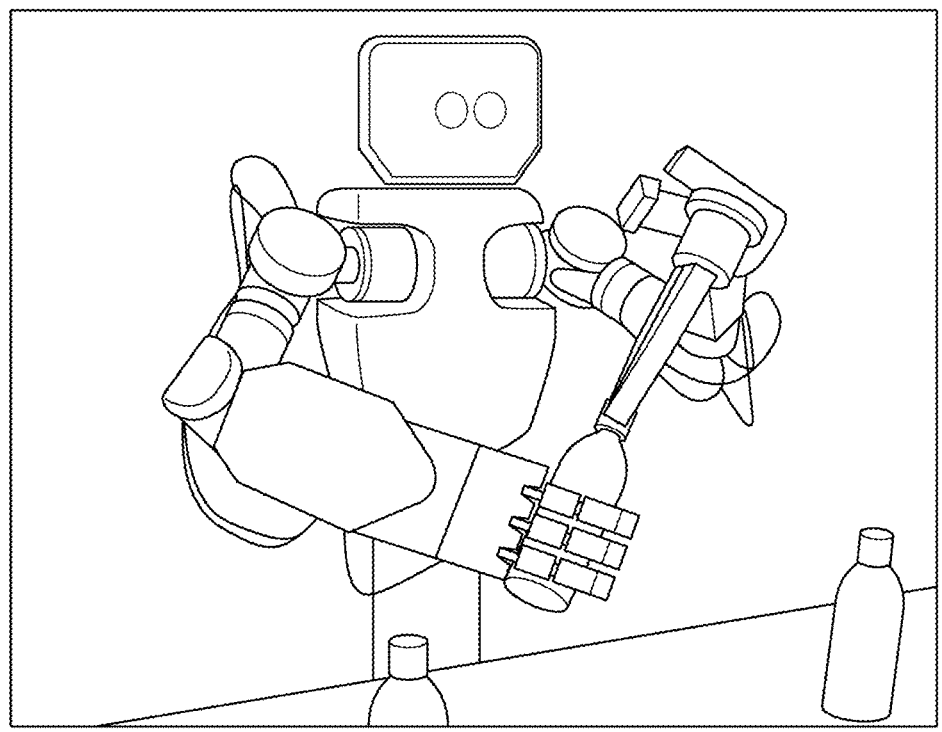
FIG. 12 is a diagram illustrating examples of different subtasks according to the second embodiment.
FIG. 13 is a diagram illustrating an example of a state in which a robot is working by tele-operation of the second embodiment.

In this embodiment, the overall task of picking and placing target objects is broken down into different (sub) tasks. The support provided by the tele-operation assistance system 1A to the operator depends on and varies with the current subtask. In this embodiment, the system switches between the different subtasks as shown in FIG. 12 based on the operator's intentions, the distance between the hand of the robot 6 and the object, and the feasibility of the operator's current action. FIG. 12 is a diagram illustrating examples of different subtasks according to this embodiment. The subtasks are used in the second mode of the first embodiment.

(1) Approach Object

When at least one object is detected in the scene and the system receives a pick intention for that object, the "Approach Object" action extends the hand in any direction.

Only if the robot 6 is about to reach its joint or speed limits, the tele-operation assistance system 1A will override those commands. In that case, the tele-operation assistance system 1A will either stop robot 6 or slightly modify the trajectory of robot 6 to prevent it from reaching its limits. In the background, the grasping posture for a given object is calculated from the current hand posture of robot 6. The grasping posture is updated, for example, at about 40 Hz.

(2) Snap to Object

When the distance between the hand of robot 6 and the calculated grasping posture becomes less than a predefined threshold, the tele-operation assistance system 1A takes over control and automatically moves the end effector of robot 6 to the grasping posture. During that short period of time (usually less than one second), the operator's hand movements do not affect the movement of the robot 6. The reason for this behavior is that it has been observed that it is difficult for the operator to accurately judge the relative distance between the hand and the object because of the lack of depth perception.

(3) Align with Object

After the end effector has reached the grasping posture, the operator can still move the end effector around the target object in the null space of the stable grasping posture provided by the manifold used to calculate the grasping posture. For example, when snapped to the side of a cylinder, the end effector can move up and down a vertical axis. It can also move around the cylinder, but its motion around the roll angle is blocked to avoid collision with the object.

This allows the operator to move the end effector to fine-tune the desired grasping posture, and to maintain his/her initiative even if he/she is assisted in positioning. Then the robot 6 moves to the calculated grasping posture without colliding with the object. The grasping posture also includes the desired finger joint placement. However, this finger arrangement is ignored until the operator actually begins to grasp the object.

(4) Grasp Object

When the operator is satisfied with the posture of the end effector and presses the button of the data glove, the fingers of the hand of robot 6 are closed. In this operation, the end effector does not move. Since a feed-forward controller is used, it can be simply assumed that the object is grasped when the fingers are virtually completely closed because the operator feels that he/she has grasped the object and completes the operation instructions.

(5) Align with Surface

After grasping the object, the operator can move the object on the current support surface (e.g., table). Minute movements in the direction normal to the surface and rotations other than around the surface normal are ignored, and the object remains in contact with the support surface. Like for Align with Object, the tele-operation assistance system 1A can freely adjust its posture on the surface while keeping the target object in contact with the support surface. When the operator moves the data glove away from the support surface, the tele-operation assistance system 1A lifts the object up and switches to another action.

(6) Unsnap from Surface

When the operator moves the hand virtually away from the support surface, the hand of robot 6 can autonomously lift the object without colliding with other objects.

(7) Approach Surface

After lifting the object, the tele-operation assistance system 1A is in a state where the operator can again freely move around the object in the scene. Therefore, this mode is similar to Approach Object with the only difference that the robot 6 holds the object in its hand.

(8) Snap to Surface

When approaching the estimated location of the object, the tele-operation assistance system 1A again takes over control and automatically places down the held object so that it is placed stably on the surface. After snapping, the tele-operation assistance system 1A switches again to Align with Surface, and the operator can either move the object on the support plane to fine-tune the placement posture or open the fingers of the robot 6 and move away from the object (or align the hand with it).

(9) Release Object

In this state, the robot 6 simply opens its fingers and the end effector is not allowed to move.

<Simulator>

In this embodiment, before transmitting the target posture to the actual robot 6, it is firstly simulated whether or not the robot 6 can actually reach that posture. The controller simulator 57 calculates the joint velocity using the resolved motion rate controller, multiplies it with a step size, and adds it to the current joint angle of robot 6. The controller simulator 57 checks the newly calculated posture of robot 6 to see if it is at collision or joint limits and if the desired target posture has already been reached. The controller simulator 57 continues to perform those steps until the operation is considered successful, infeasible, or a time limit (e.g., 500 ms) has been reached. The advantage of this controller simulator 57 is that it is fast enough to be computed in real time. Since the simulation is continuously executed, sufficient accuracy is ensured. The simulation uses the same controller used to calculate the control commands for the actual robot 6.

<Feedback Signals>

Haptic feedback is utilized to signal warnings to the operator when the robot movement is altered to avoid physical limits (e.g., joint limits) and collisions of the robot, such as self-collisions or collisions with objects in the scene. Feedback signals are sent to the data glove. The data glove is equipped with a transducer, for example, and transmits feedback information to the operator in response to the feedback signal.

<Confirmation Result>

FIG. 13 is a diagram illustrating an example of a state in which a robot is working by tele-operation in this embodiment. In the example in FIG. 13, the robot 6 grasps a PET bottle, which is the target object, with its hand and rotates the lid with the gripper to open it based on tele-operation.

The robot 6 may have one arm and the end effector may be a gripper, as in FIG. 10, or it may have both arms, with a multi-fingered hand on one arm and a gripper on the other arm, as in FIG. 13. Thus, in this embodiment, the robot 6 as shown in FIG. 10 and the robot 6 as shown in FIG. 13 were used for confirmation.

As described above, this embodiment uses a shared autonomous teleoperation framework based on virtual reality, for example, to provide support to the human operator during object interactions such as pick-and-place task.

Accordingly, according to this embodiment, it is possible to assist in diverse teleoperation tasks where a variety of tasks are performed on a wide variety of objects.

Some or all of the processes which are performed by the operation amount determination unit 5 (or 5A) may be performed by recording a program for realizing some or all of the functions of the operation amount determination unit 5 (or 5A) according to the present invention on a computer-readable recording medium and causing a computer system to read and execute a program recorded on the recording medium. The "computer system" mentioned herein may include an operating system (OS) or hardware such as peripherals. The "computer system" may include a WWW system including a homepage provision environment (or a homepage display environment). Examples of the "computer-readable recording medium" include a portable medium such as a flexible disk, a magneto-optical disc, a ROM, or a CD-ROM and a storage device such as a hard disk incorporated in a computer system. The "computer-readable recording medium" may include a medium that holds a program for a predetermined time such as a non-volatile memory (ROM) in a computer system serving as a server or a client when a program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit. The program may be a program for realizing some of the aforementioned functions. The program may be a so-called differential file (a differential program) which can realize the aforementioned functions in combination with another program stored in advance in the computer system.

While a mode for carrying out the present invention has been described above with reference to an embodiment, the present invention is not limited to the embodiment, and various modifications or replacements may be added thereto without departing from the gist of the present invention.

What is claimed is:

1. A tele-operation assistance system for remotely operating at least an end effector, comprising:
  a processor configured to:
  acquire information on a motion of an operator operating at least the end effector;
  estimate a target object to be operated by the end effector and a task which is a method of operating the target object by using the information on the motion of the operator;
  acquire environmental information of an environment in which the end effector is operated; and
  based on the estimate of the target object to be operated by the end effector and the task and the environmental information of the environment, determine an operation amount of the end effector,
  wherein an operation distance to the target object is estimated based on the information of the target object and the motion of the operator, an operation state of the end effector with respect to the target object according to the estimated operation distance is determined, and an input mode of assistance to a tele-operation according to the operation state is changed, and
  wherein
    a distant state in which a distance to the target object is farther;
    a peripheral state in which a position to the target object is closer; and
    an operated state in which the target object is operated, and
  the input mode of assistance includes:
    a distant mode which directly uses the motion of the operator during the distant state in which the distance to the target object is farther;
    a peripheral mode which guides to a working position of the object to the target object during the peripheral state in which the position to the target object is closer; and
    an operated mode which assists a manipulation to the target object during the operated state in which the target object is operated.

2. The tele-operation assistance system according to claim 1,
  wherein the peripheral mode is classified into:
    a state of bringing a hand close to the target object (Approach Object);
    a state of moving the hand to a position where the target object can be grasped (Snap to Object);
    a state of adjusting a final grasping position in accordance with a surface of the target object and in response to an instruction of the operator (Align with Object);
    a state of moving the hand away from a vicinity of the target object (Align with Object),
  wherein transitions among the four states according to a work content and a work state are switched.

3. The tele-operation assistance system according to claim 2, wherein the transitions among the four states according to the work content and the work state are switched based on using hand command values of the operator, estimated intention information, the environmental information, and a model learned by inputting a teacher data which is the work content.

4. A tele-operation assistance method that is performed by a tele-operation assistance system for remotely operating at least an end effector, the tele-operation assistance method comprising:
  acquiring information on a motion of an operator operating at least the end effector;
  estimating a target object to be operated by the end effector and a task which is a method of operating the target object by using the information on the motion of the operator;
  acquiring environmental information of an environment in which the end effector is operated; and
  based on the estimate of the target object to be operated by the end effector and the task and the environmental information of the environment, determining an operation amount of the end effector,
  the tele-operation assistance method further comprising:
  estimating an operation distance to the target object based on the information of the target object and the motion of the operator, determining an operation state of the end effector with respect to the target object according to the estimated operation distance, and changing an input mode of an assistance to a tele-operation according to the operation state, and
  wherein
    a distant state in which a distance to the target object is farther;
    a peripheral state in which a position to the target object is closer; and
    an operated state in which the target object is operated, and
  the input mode of assistance includes:
    a distant mode which directly uses the motion of the operator during the distant state in which the distance to the target object is farther;

a peripheral mode which guides to a working position of the object to the target object during the peripheral state in which the position to the target object is closer; and an operated mode which assists a manipulation to the target object during the operated state in which the target object is operated.

* * * * *